United States Patent
Keene (10) Patent No.: US 7,970,706 B2
(45) Date of Patent: Jun. 28, 2011

(54) SYSTEM AND METHOD FOR CHECK EXCEPTION ITEM NOTIFICATION

(75) Inventor: Alexandra Keene, Plano, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 1135 days.

(21) Appl. No.: 09/809,494

(22) Filed: Mar. 15, 2001

(65) Prior Publication Data

US 2001/0039534 A1   Nov. 8, 2001

Related U.S. Application Data

(60) Provisional application No. 60/190,176, filed on Mar. 17, 2000.

(51) Int. Cl.
*G06Q 40/00* (2006.01)

(52) U.S. Cl. .......................... 705/45; 705/35

(58) Field of Classification Search ............... 705/35–45
See application file for complete search history.

(56) References Cited

U.S. PATENT DOCUMENTS

| | | |
|---|---|---|
| 4,264,808 A | 4/1981 | Owens et al. |
| 5,168,444 A | 12/1992 | Cukor et al. |
| 5,237,159 A | 8/1993 | Stephens et al. |
| 5,265,007 A | 11/1993 | Barnhard, Jr. et al. |
| 5,373,550 A | 12/1994 | Campbell et al. |
| 5,504,822 A | 4/1996 | Holt |
| 5,532,464 A | 7/1996 | Josephson et al. |
| 5,689,579 A | 11/1997 | Josephson |
| 5,691,524 A | 11/1997 | Josephson |
| 5,717,868 A | 2/1998 | James |
| 5,781,654 A * | 7/1998 | Carney .......................... 382/137 |
| 5,783,808 A | 7/1998 | Josephson |
| 5,819,236 A | 10/1998 | Josephson |
| 5,832,463 A | 11/1998 | Funk |
| 5,848,400 A | 12/1998 | Chang |
| 5,870,725 A | 2/1999 | Bellinger et al. |
| 5,889,863 A | 3/1999 | Weber |
| 5,890,141 A | 3/1999 | Carney et al. |
| 5,895,455 A * | 4/1999 | Bellinger et al. ............... 705/35 |
| 5,930,778 A | 7/1999 | Geer |
| 5,940,844 A | 8/1999 | Cahill et al. |
| 5,978,780 A | 11/1999 | Watson |
| 5,978,840 A | 11/1999 | Nguyen et al. |

(Continued)

FOREIGN PATENT DOCUMENTS

WO   WO 98/47100   10/1998

OTHER PUBLICATIONS www.afsimage.com/solutions/checkprocesing/frauddetection/positivepay.aspx.*

(Continued)

*Primary Examiner* — Richard C Weisberger (74) *Attorney, Agent, or Firm* — Goodwin Procter LLP (57) ABSTRACT

A system mainframe receives a payee check file and a payor check file and produces an exception file including at least one exception item. A server receives the exception file and generates a Web file including information relating to the exception item and generates an address for the Web file. The server further sends an exception client an e-mail which notifies the exception client of the exception item and provides the exception client with the address for the Web file.

13 Claims, 4 Drawing Sheets

U.S. PATENT DOCUMENTS

| | | | |
|---|---|---|---|
| 6,041,315 | A | 3/2000 | Pollin |
| 6,178,409 | B1 | 1/2001 | Weber et al. |
| 6,301,379 | B1 | 10/2001 | Thompson et al. |
| 6,363,164 | B1 | 3/2002 | Jones et al. |
| 2001/0037315 | A1* | 11/2001 | Saliba et al. .................... 705/70 |
| 2002/0001393 | A1 | 1/2002 | Jones et al. |

OTHER PUBLICATIONS

Higher Demand for Image Wholesale Foreseen; Item Processing Report; vol. 8(1); Jan. 16, 1997 (Bates: JPMC 264452—JPMC 264459).

ANSI X9/TG15-1997—Technical Guideline: To Aid In The Understanding and Implementation of Financial Image Interchange; Accredited Standards Committee X9—Financial Services; Aug. 1, 1997 (Bates: JPMC 264756—JPMC 264819).

Letter to Mike Reynolds of Data Management Products, Inc. Regarding Software Specifications and Requirements for our Exceptions/DCS Image Project; Carl A. Natola; Shawmut Bank; Apr. 7, 1993 (Bates: JPMC 265648—JPMC 265654).

The Image Forum Summary; Sep. 11, 1996 (Bates: JPMC 267860—JPMC 267887).

Computerized Document Imaging Systems: Technology and Applications; Nathan J. Muller; Artech House;; Jan. 1, 1993 (Bates: JPMC 267888—JPMC 268050).

IBM ImagePlus HPTS Proposal for Electronic Data Systems Corporation; IBM Corporation; Jun. 21, 1994 (Bates: JPMC CARKR 000045—JPMC CARKR 000078).

Outline for Initial Usage of Optical Disk Project; Aug. 3, 1990 (Bates: JPMC-CMSQ_000019—JPMC-CMSQ_000022).

Letter to Corn Squared Systems Enclosing Contract Between Federal Reserve Bank of Chicago and Com Squared Systems; D.J. Miller; Federal Reserve Bank of Chicago; May 23, 1994 (Bates: JPMC-CMSQ_000088—JPMC-CMSQ_000161).

Imaging Research and Development Document; Jul. 13, 1994 (Bates: JPMC-CMSQ_000126—JPMC-CMSQ_000161).

Service Agreement Between Fiserve Solutions Inc. and Compas Bank; Feb. 12, 1997 (Bates: JPMC-COMPSS_000038—JPMC-COMPSS_000063).

Fiserv-Financial Data Agreement for Item Processing And/Or Back Office Services; Nov. 15, 1994 (Bates: JPMC-COMPSS_000115—JPMC-COMPSS_000128).

Check Truncation Prepared for Bank Administration Institute; Littlewood, Shain and Company; Jan. 1, 1980 (Bates: JPMC-ECCHO 009512—JPMC-ECCHO_009654).

PACES (Paperless Automated Check Exchange & Settlement Project Proposal; Financial Services Technology Consortium; Feb. 5, 1998 (Bates: JPMC-PACES_004565—JPMC-PACES_004589).

Case Studies in Check Image Archive Applications at Large US Banks: Making the Business Case; David W. Medeiros; Tower Group; Jul. 1, 1998.

NCR's ATM captures images at the point of deposit. (NCR Corp.'s new automated teller machine)(Product Announcement) Financial Services Report; Gale Group; Jan. 20, 1993.

Check Processing Conference Reference Guide; Mar. 22, 1994.

Image Technology in Banking Conference; The Bank Administration Institute Foundation; Oct. 18, 1995.

Various minutes of Interbank Check Image Project meetings of the Financial Services Technology Consortium at Lawrence Livermore National Laboratory on Apr. 25-26, 1994 as well as charts and presentation material; Apr. 25, 1994 (Bates: JPMC 000964—JPMC 001010).

Financial Services Technology Consortium Interbank Check Imaging Project Summary Report; Financial Services Technology Consortium (Bates: JPMC 001038—JPMC 001048).

Workflow Software in Banking: Update; David W. Medeiros; Tower Group; Apr. 30, 1996 (Bates: JPMC 002690—JPMC 002701).

Check Image in Proof of Deposit: Update; David W. Medeiros; Tower Group; Mar. 31, 1996 (Bates: JPMC 002702—JPMC 002712).

Check Image Technology in Corporate Cash Management Applications; David W. Medeiros; Tower Group; Feb. 29, 1996 (Bates: JPMC 002713—JPMC 002733).

Electronic Check Presentment; David W. Medeiros; Tower Group; Nov. 30, 1994 (Bates: JPMC 002734—JPMC 002751).

Check Imaging in Proof of Deposit Operations; David W. Medeiros; Tower Group; Jul. 30, 1993 (Bates: JPMC 002761JPMC 002773).

Check Fraud Prevention Technologies; David W. Medeiros; Tower Group; Apr. 30, 1996, (Bates: JPMC 002788—JPMC 002803).

Statements with Check Images: Update; David W. Medeiros; Tower Group; Mar. 31, 1996 (Bates: JPMC 002804—JPMC 002813).

Case Studies in Check Imaging Technology for Corporate Cash Management Applications; David W. Medeiros; Tower Group; Mar. 31, 1996 (Bates: JPMC 002814—JPMC 002827).

Lockbox Check Processing: Wholesale, Retail, Imaging, and Workflow Technology; David W. Medeiros; Tower Group; Mar. 31, 1995 (Bates: JPMC 002835—JPMC 002847).

IBM's High Performance Transaction System (HPTS): A Status Report at the Five-Year Point; David W. Medeiros; Tower Group; Mar. 31, 1995 (Bates: JPMC 002848—JPMC 002859).

Small-Scale Check Imaging Systems; David W. Medeiros; Tower Group; Feb. 28, 1995 (Bates: JPMC 002860—JPMC 002873).

Workflow Software in Banking; David W. Medeiros; Tower Group; Jan. 26, 1994 (Bates: JPMC 002881—JPMC 002895).

The Road to Imaging for Community Banks; D. Trent Fleming; ABA Banking Journal; Dec. 1, 1993 (Bates: JPMC 008484—JPMC 008488).

Banks Turn Imaging into Speedy New Delivery Products; Denise A. Arnette; Corporate Cashflow; vol. 15(1); Jan. 1, 1994 (Bates: JPMC 008542—JPMC 008544).

Add Value by Reinventing Accounts Receivable Processing; Corporate Cashflow; vol. 15(2); Feb. 1, 1994 (Bates: JPMC 008588—JPMC 008591).

Banking's Role in Tomorrow's Payments System vol. II Payments System Overview; Furash & Company; Jun. 1, 1994 (Bates: JPMC 009399—JPMC 009424).

AT&T SIIPS Proof-of-Deposit Operations Guide D1-4619-A Issue 1; AT&T Mar. 1, 1995 (Bates: JPMC 013290—JPMC 013628).

AT&T SIIPS Proof-of-Deposit General Information; AT&T (Bates: JPMC 013629—JPMC 013811).

AT&T SIIPS Proof-of-Deposit Systems Administration Guide; AT&T Jan. 1, 1995 (Bates: JPMC 013812—JPMC 014253).

Few Banks Buying Check-Image Systems; Karen Gullo; American Banker; Apr. 5, 1994 (Bates: JPMC 150610—JPMC 150618).

Development of an Image-Enhanced Truncation Check Processing System—Request for Proposals; Mar. 20, 1992 (Bates: JPMC 150845—JPMC 150909).

Development of an Image-Enhanced Truncation Check Processing System—Request and Proposals; Feb. 1, 1992 (Bates: JPMC 150910—JPMC 150987).

IBM Study Finds Potential Savings of 12% from Internal Check Nonreturn; E. Clark Grimes; American Banker; p. 14; May 21, 1980 (Bates: JPMC 150995—JPMC 150999).

IA Corp. Uses StorageTek Robotic Library for First Client/Server Check Image Archive at Union Bank of California; New Client/Server CheckVision Archive Application Stores Millions of Checks Per Day Using StorageTek Technology for Quicker Image Retrieval; Business Wire, Inc.; Oct. 7, 1996 (Bates: JPMC 151194—JPMC 151196).

Image Technology in Banking Conference—Achieving Greater Profitability Through Improved Information Management Reference Guide; Oct. 18, 1995 (Bates: JPMC 151351—JPMC 151952).

BAI Check Processing Conference Mar. 22-25, 1994—Check Processing Reference Guide; Mar. 22, 1994 (Bates: JPMC 151953—JPMC 152557).

Request for Proposal for Check Image Processing and Image Archival and Retrieval Systems for the Federal Reserve; Federal Reserve Bank of Boston; Apr. 21, 1994 (Bates: JPMC 152558—JPMC 152758).

Request for Proposal for Check Image and Retrieval Systems for the Federal Reserve Amended May 26, 1994; Federal Reserve Bank of Boston; May 26, 1994 (Bates: JPMC 152794—JPMC 153091).

FSTC Paces Project Collecting Bank—Non-Image ECP Flow—Flow No. 1; Image Archive Forum; Sep. 10, 1997 (Bates: JPMC 154113—JPMC 154159).

PACES Paperless Automated Check Exchange & Settlement Project Proposal; Financial Services Technology Consortium; Apr. 3, 1998 (Bates: JPMC 154183—JPMC 154207).

Remittance Companies Eager to Embrace Uses for New Image Technology; Item Processing Report; Phillips Business Information, Inc.; vol. 6(14); Jul. 20, 1995 (Bates: JPMC 154838—JPMC 154847).

Group Unveils Paperless Check-Clearing System—System Promises One-Third Reduction in Processing Costs; Item Processing Report; Phillips Business Information, Inc.; vol. 6(25); Dec. 21, 1995 (Bates: JPMC 154895—JPMC 154902).

Major Check Industry Changes No Longer a Pipe Dream; Financial Services Report; Phillips Business Information, Inc.; vol. 9(25); Dec. 23, 1992 (Bates: JPMC 155006—JPMC 155010).

Electronic Check Presentment: An Introduction; American Bankers Association; Jan. 1, 1995 (Bates: JPMC 244003—JPMC 244102).

Image-Based Transaction Processing—The Banking Industry's Challenge for the 1990s and Beyond; Andersen Consulting; American Bankers Association (Bates: JPMC 260340—JPMC 260397).

MAC ICON Services Unveiled Opening New Era of Electronic Banking; MAC News; Jun. 14, 1990 (Bates: JPMC 260398—JPMC 260436).

Creating the image of automation; Martin Whybrow; Banking Technology; Nov. 1, 1990 (Bates: JPMC 260458—JPMC 260465).

Preventing Loss from Check Fraud; Mark Krasinski; The Bank of New York; TMA Journal; Jul. 1, 1996 (Bates: JPMC 261023—JPMC 261025).

Integrated Redesign Solutions With Electronic Commerce; Mark Tabor, et al.; TMA Journal; Jan. 1, 1996 (Bates: JPMC 261028—JPMC 261033).

Proceedings: Transaction Processing Applications Solutions: The User's Perspective; TAWPI; Jul. 9, 1995 (Bates: JPMC 262135—JPMC 262914).

Emails between Bobby Sapp and Trish Shoemaker; Memo from Robert Woods to Tedd Wilson; The BISYS Group; other misc. received from Pat Caldwell.; Bobby Sapp, et al; Jun. 23, 1998 (Bates: JPMC-BCST 00000020—JPMC-BCST 00000069).

Document Imaging and Workflow Project Section 1 Management Summary/Proposal Overview; Unisys; Comerica (Bates: JPMC-COMER-00000001—JPMC-COMER-00000010).

Checkvision Project Kick-off; IA Corp; Comerica Corporation; Jul. 22, 1996 (Bates: JPMC-COMER-00000044—JPMC-COMER-00000095).

Image Archive Utility—Stage 2; IA Corp.; Comerica Bank; Sep. 6, 1996 (Bates: JPMC-COMER-00000096—JPMC-COMER-00000206).

Requirements Definition Report Prime & Recapture Export IXPS 839—Phase 1 & and Image Export Processing System Final Draft; Unisys; Comerica; Jul. 10, 1996 (Bates: JPMC-COMER-00000207—JPMC-COMER-00000231).

Document Imaging and Workflow Project Section 4 Benefits Summary; Unisys; Comerica; Feb. 1, 1996 (Bates: JPMC-COMER-00000232—JPMC-COMER-00000270).

A Framework for Exchanging Image Returns; FRB/Industry Returns Task Force; Jul. 1, 2001 (Bates: JPMC-ECCHO 000727—JPMC-ECCHO 000855).

Payments Systems Task Force Economic Framework; Image Archive Forum; Jan. 27, 1998 (Bates: JPMC-ECCHO 000871—JPMC-ECCHO 000904).

Payments System Task Force; Image Archive Forum (Bates: JPMC-ECCHO 000905—JPMC-ECCHO 000956).

Methodology & Value; Image Archive Forum; Sep. 19, 1997 (Bates: JPMC-ECCHO 000957—JPMC-ECCHO 000976).

Check Information Age; Image Archive Forum; May 13, 1998 (Bates: JPMC-ECCHO 000977—JPMC-ECCHO 001001).

FSTC Paces Project Document Image Quality White Paper; Mariano Roldan, Jr.; Chase Manhattan Bank; Oct. 13, 1999 (Bates: JPMC-ECCHO 001165—JPMC-ECCHO 001198).

FSTC Paces New Reports (Op # 24) (Bates: JPMC-ECCHO 001227—JPMC-ECCHO 001238).

Appendix E: Definition of Image Analysis Flags (Bates: JPMC-ECCHO 001305—JPMC-ECCHO 001312).

FSTC PACES Image Presentment Exceptions Issue # 36; Phyllis Meyerson; Dec. 8, 1998 (Bates: JPMC-ECCHO 001598—JPMC-ECCHO 001648).

FSTC PACES Image Presentment Exceptions Issue # 36 (Updated); Phyllis Meyerson; Feb. 24, 1999 (Bates: JPMC-ECCHO 001649—JPMC-ECCHO 001696).

PACES Reports (reports needed to support the PACES process) (Bates: JPMC-ECCHO 001826—JPMC-ECCHO 001844).

FSTC PACES Project Operations Task #34 Missing Check Images; Antonio C. Silva; Comerica Bank; Dec. 22, 1998 (Bates: JPMC-ECCHO 001974—JPMC-ECCHO 001976).

FSTC Paces Project Document Operational Contingencies (Ops #37); Bob Howe, et al.; BancTec/Chase Manhattan Bank; Oct. 29, 1999 (Bates: JPMC-ECCHO 001985—JPMC-ECCHO 001986).

PACES Business Requirements; Paces Standards Team; Jul. 29, 1998 (Bates: JPMC-ECCHO 002190—JPMC-ECCHO 002195).

PACES Functional Specifications vol. 2 Final Version; Financial Services Technology Consortium; Sep. 1, 2000 (Bates: JPMC-ECCHO 002196—JPMC-ECCHO 002261).

Appendix 11: Return Processing—Electronic vs. Paper; Financial Services Technology Consortium; Sep. 1, 2000 (Bates: JPMC-ECCHO 002262—JPMC-ECCHO 002303).

Appendix 12: New Reports; Financial Services Technology Consortium; Sep. 1, 2000 (Bates: JPMC-ECCHO 002386—JPMC-ECCHO 002479).

Appendix 20: Operational Contingencies; Financial Services Technology Consortium; Sep. 1, 2000 (Bates: JPMC-ECCHO 002550—JPMC-ECCHO 002564).

PACES Functional Specifications vol. 1 Final Version; Financial Services Technology Consortium; Sep. 1, 2000 (Bates: JPMC-ECCHO 002783—JPMC-ECCHO 003028).

FSTC Paces Image Presentment Exceptions Issue # 36; Phyllis Meyerson; Dec. 8, 1998 (Bates: JPMC-ECCHO 003644—JPMC-ECCHO 003694).

Appendix 1: PACES 'Original' Requirements; Mar. 22, 1999 (Bates: JPMC-ECCHO 004443—JPMC-ECCHO 004537).

FSTC PACES Documentation Bad Tapes Draft; Mike Desman, et al.; Federal Reserve Bank; Dec. 21, 1998 (Bates: JPMC-ECCHO 004585—JPMC-ECCHO 004586).

FSTC PACES Documentation Bad Tapes Draft; Mike Desman, et al.; Federal Reserve Bank; Jan. 4, 1999 (Bates: JPMC-ECCHO 004588—JPMC-ECCHO 004589).

PACES Business Justification (Bates: JPMC-ECCHO 004646—JPMC-ECCHO 004653).

ECCHO Operating Rule and Commentary Amendments to Accommodate Electronic Image Draft; Jun. 22, 1999 (Bates: JPMC-ECCHO 005213—JPMC-ECCHO 005296).

ECCHO Operating Rule and Commentary Amendments to Accommodate Electronic Image. Draft; Aug. 19, 1999 (Bates: JPMC-ECCHO 005393—JPMC-ECCHO 005491).

FSTC—PACES Measurement of Pilot Success Collecting Institution Draft; (Bates: JPMC-ECCHO 005948—JPMC-ECCHO 005950).

FSTC PACES Project Document Operational Contingencies (Ops #37); Bob Howe, et al.; BancTec & Chase Manhattan Bank; Oct. 4, 1999 (Bates: JPMC-ECCHO 005955—JPMC-ECCHO 005957).

FSTC PACES Documentation Elimination of Power Encoding (Op#31); Mariano S. Roldan; Chase Manhattan Bank; Aug. 24, 1999 (Bates: JPMC-ECCHO 005966—JPMC-ECCHO 005967).

FSTC PACES Project Paying Bank—Image Flow—Multiple Institutions—(Flow No. 8) (Bates: JPMC-ECCHO 006046—JPMC-ECCHO 006047).

PACES Functional Specifications 6 Functional Specifications; Financial Services Technology Consortium; Mar. 15, 1999 (Bates: JPMC-ECCHO 006207—JPMC-ECCHO 006221).

PACES Functional Specifications 6.3 Business Req. To Functional Req. Matrix; Financial Services Technology Consortium; Jan. 1, 1998 (Bates: JPMC-ECCHO 006222—JPMC-ECCHO 006231).

FSTC Agenda PACES Operations Subcommittee Meeting Boston; Financial Services Technology Consortium (Bates: JPMC-ECCHO 006507—JPMC-ECCHO 006508).

Archive Audit Trail High Level Design (Bates: JPMC-ECCHO 006540—JPMC-ECCHO 006540).

Memorandum Re: Possible Processing Problems for ECP (Bates: JPMC-ECCHO 006541—JPMC-ECCHO 006541).
A Preliminary Analysis of: On-Us Document Processing in an Image POD, Environment; Chase Manhattan Bank; Dec. 1, 1998 (Bates: JPMC-ECCHO 006557—JPMC-ECCHO 006570).
FSTC PACES Project Operations Document #1 Physical Check Truncation Identifier; John Fricke; Chase Bank of Texas; Feb. 8, 1999 (Bates: JPMC-ECCHO 006618—JPMC-ECCHO 006624).
PACES Ops Team Mtg Agenda for Jul. 13; John Fricke; Jul. 10, 1998 (Bates: JPMC-ECCHO 006683—JPMC-ECCHO 006684).
PACES Pilot Phases Exit Criteria Draft #1; Jun. 10, 1998 (Bates: JPMC-ECCHO 006940—JPMC-ECCHO 006941).
Technology Discussion Questions and Ancillary Discussion Topics for the Other Subcommittees or Vendors (Bates: JPMC-ECCHO 007052—JPMC-ECCHO 007054).
FSTC PACES Paperless Automated Check Exchange & Settlement Project Proposal; Financial Services Technology Consortium; Feb. 19, 1998 (Bates: JPMC-ECCHO 007128—JPMC-ECCHO 007152).
PACES Risk Analysis Work Effort—Supporting the PACES Implementation; Christopher Dowdell; BancTec; Apr. 1, 1999 (Bates: JPMC-ECCHO 007264—JPMC-ECCHO 007278).
PACES Functional Specifications 6 Functional Specifications; Financial Services Technology Consortium; Jan. 1, 1998 (Bates: JPMC-ECCHO 007475—JPMC-ECCHO 007489).
ECCHO Operating Rule and Commentary Amendments to Accommodate Electronic Image Draft; Jul. 1, 1999 (Bates: JPMC-ECCHO 007729—JPMC-ECCHO 007815).
ECCHO Operating Rule and Commentary Amendments to Accommodate Electronic Image Draft (Bates: JPMC-ECCHO 007936—JPMC-ECCHO 008009).
Updated Project Plan and Issues List; PACES Rules and Regulatory Team; Jul. 13, 1998 (Bates: JPMC-ECCHO 008011—JPMC-ECCHO 008018).
ECCHO Operating Rule and Commentary Amendments to Accommodate Electronic Image Draft (Bates: JPMC-ECCHO 008046—JPMC-ECCHO 008123).
FSTC PACES Pilot Definition; Financial Services Technology Consortium; Mar. 3, 1999 (Bates: JPMC-ECCHO 008325—JPMC-ECCHO 008336).
Letter enclosing Revised Check Processing Flows and Narratives for the Collecting and Paying Bank Functions; James Sarras; Chase Manhattan Bank; Aug. 21, 1997 (Bates: JPMC-ECCHO 008851—JPMC-ECCHO 008881).
Memo enclosing ECCHO vision document, CHAS truncation case, NE Economic Review on ECP and Truncation and article on Cost Savings in Truncation by Lipis; Phyllis Meyerson; Oct. 17, 1997 (Bates: JPMC-ECCHO 009031—JPMC-ECCHO 009064).
The Check Payments System: A Historical and Contemporary View; Financial Services Technology Consortium; Dec. 14, 1995 (Bates: JPMC-ECCHO 009092—JPMC-ECCHO 009116).
Economic Framework Charts; Image Archive Forum; Feb. 4, 1998 (Bates: JPMC-ECCHO 009185—JPMC-ECCHO 009237).
Letter enclosing Revised Check Processing Flows and Narratives; James Sarras; Chase Manhattan Bank; Sep. 17, 1997 (Bates: JPMC-ECCHO 009240—JPMC-ECCHO 009288).
Tips for Successful Image Item Processing Discussion Paper; The Check Forum; Aug. 1, 1997 (Bates: JPMC-ECCHO 009289—JPMC-ECCHO 009306).
Clearing House Advisory Board Meeting; Oct. 20, 1997 (Bates: JPMC-ECCHO 009375—JPMC-ECCHO 009430).
DataTreasury Confidential Private Placement Memorandum; Data Treasury Corp.®DataTreasury Corp.; Aug. 1, 2000 (Bates: JPMC-INCUBE 00000092—JPMC-INCUBE 00000149).
Enterprise-Wide Imaging; Enterprise-Wide Imaging; Issues in Imaging #5; NCR; Jan. 1, 1991 (Bates: JPMC-NCR 000009—JPMC-NCR 000030).
AT&T SIIPS Proof-of-Deposit General Information; AT&T; Jun. 1, 1994 (Bates: JPMC-NCR 000048—JPMC-NCR 000224).
Technology Subcommittee Notes; Lottie Tann, et al; Jan. 21, 1998 (Bates: JPMC-PACES 000017—JPMC-PACES 000022).
PACES Functional Specifications Appendix 1: PACES Original Requirements; Financial Services Technology Consortium; Mar. 22, 1999 (Bates: JPMC-PACES 000058—JPMC-PACES 000152).
Point of Archival (Bates: JPMC-PACES 000154—JPMC-PACES 000170).
FSTC PACES Meeting Minutes; Financial Services Technology Consortium; May 7, 1999 (Bates: JPMC-PACES 000173—JPMC-PACES 000178).
FSTC PACES Meeting Minutes; Financial Services Technology Consortium; Aug. 16, 1999 (Bates: JPMC-PACES 000186—JPMC-PACES 000191).
Development Plan for Components Needed for Future BancTec Products and PACES-specific Products (Bates: JPMC-PACES 000208—JPMC-PACES 000209).
PACES Operations Team Operational Flows Discussion in Boston; John Fricke; Chase Bank of Texas (Bates: JPMC-PACES 000219—JPMC-PACES 000236).
PACES Operational Team Task Assignments Priority Sequence; John Fricke; Chase Bank of Texas (Bates: JPMC-PACES 000237—JPMC-PACES 000253).
PACES Business Justification (Bates: JPMC-PACES 000261—JPMC-PACES 000268).
Proforma letter to bank customers Re: FSTC PACES Project; Chase Manhattan Bank, et al.; Jul. 19, 1999 (Bates: JPMC-PACES 000270—JPMC-PACES 000271).
FSTC Interbank Check Imaging Project Summary Report; Financial Services Technology Consortium (Bates: JPMC-PACES 000416—JPMC-PACES 000426).
FSTC PACES Project Document ECP & Image File Encryption Draft; Ray Higgins; NCR Corporation; Oct. 21, 1999 (Bates: JPMC-PACES 000474—JPMC-PACES 000476).
FSTC PACES Project Image Exchange Process Flows; Nov. 3, 1997 (Bates: JPMC-PACES 000538—JPMC-PACES 000549).
FW: Update for May 19 Meeting; John Fricke; May 22, 1998 (Bates: JPMC-PACES 000564—JPMC-PACES 000570).
FSTC Check Imaging Project Book Matrix (Bates: JPMC-PACES 000597—JPMC-PACES 000626).
Image File Subgroup Position Paper; Lottie Tann, et al. (Bates: JPMC-PACES 000739—JPMC-PACES 000739).
FSTC PACES Project Document Image Quality White Paper; Mariano Roldan, Jr.; Chase Manhattan Bank; Jul. 20, 1999 (Bates: JPMC-PACES 000989—JPMC-PACES 001015).
FSTC PACES Legal Counsel Review of Image-Based Rules; Phyllis Meyerson; Aug. 17, 1999 (Bates: JPMC-PACES 001291—JPMC-PACES 001306).
Meeting Minutes Technology Group Dec. 11, 1997; Paul Platto; (Bates: JPMC-PACES 001316—JPMC-PACES 001317).
PACES Business Requirements; PACES Standards Team; Jul. 29, 1998 (Bates: JPMC-PACES 001344—JPMC-PACES 001348).
PACES Technology Team / Standards Team Meeting Minutes; Jul. 29, 1998 (Bates: JPMC-PACES 001349—JPMC-PACES 001349).
FSTC PACES Project Guidelines for Back Office Application Impact Analysis; Richard Benz; Check Solutions Company; Aug. 24, 1999 (Bates: JPMC-PACES 001357—JPMC-PACES 001359).
FSTC PACES Meeting Minutes; Financial Services Technology Consortium; Mar. 2, 1999 (Bates: JPMC-PACES 001361—JPMC-PACES 001363).
FSTC PACES Project Back Office Application Impact Analysis; Richard Benz; Check Solutions Company; Feb. 25, 1999 (Bates: JPMC-PACES 001381—JPMC-PACES 001383).
Operations Meeting Minutes; May 5, 1999 (Bates: JPMC-PACES 001384—JPMC-PACES 001385).
Action Items (Bates: JPMC-PACES 001392—JPMC-PACES 001393).
FSTC—PACES Steering Committee Meeting Minutes; Financial Services Technology Consortium; Feb. 12, 1998 (Bates: JPMC-PACES 001394—JPMC-PACES 001396).
FSTC PACES Meeting Minutes; Financial Services Technology Consortium; Jun. 24, 1999 (Bates: JPMC-PACES 001401—JPMC-PACES 001403).
FSTC PACES Paperless Automated Check Exchange & Settlement Requirements Document; Financial Services Technology Consortium; Apr. 3, 1998 (Bates: JPMC-Paces 001405—JPMC-PACES 001428).

PACES Project Back Office Application Impact Analysis; Richard Benz; Check Solutions Company; Aug. 17, 1999 (Bates: JPMC-PACES 001564—JPMC-PACES 001566).
FSTC PACES Documentation Bad Physical Media Draft; Mike Desman, et al.; Federal Reserve Bank; May 14, 1999 (Bates: JPMC-PACES 001571—JPMC-PACES 001572).
Operations Team Meeting Minutes; Mariano S. Roldan; Jun. 30, 1999 (Bates: JPMC-PACES 001587—JPMC-PACES 001587).
FSTC PACES Project Back Office Application Impact Analysis; Richard Benz; Check Solutions Company; Feb. 25, 1999 (Bates: JPMC-PACES 001588—JPMC-PACES 001590).
FSTC PACES Documentation Elimination of Power Encoding (Op#31); Mariano S. Roldan; Chase Manhattan Bank; Aug. 31, 1999 (Bates: JPMC-PACES 001609—JPMC-PACES 001610).
FSTC PACES ECP with Image to Follow Processing Exceptions; Kenny Trice; Fleet Bank; Aug. 6, 1999 (Bates: JPMC-PACES 001611—JPMC-PACES 001613).
FSTC PACES Project Guidelines for Back Office Application Impact Analysis (Op#42); Richard Benz; Check Solutions Company; Aug. 24, 1999 (Bates: JPMC-PACES 001616—JPMC-PACES 001618).
FSTC PACES Project Document New Reports (Op # 24); Betsy Meehan; Chase Manhattan Bank; Dec. 7, 1999 (Bates: JPMC-PACES 001639—JPMC-PACES 001640).
FSTC PACES Project Operations Document #36 Image Presentment Exceptions; Kenny Trice; Fleet Bank; Feb. 22, 1999 (Bates: JPMC-PACES 001659—JPMC-PACES 001662).
FSTC PACES ECP Balancing & Controls for Image Exchanges; Kenny Trice; Fleet Bank; Dec. 14, 1998 (Bates: JPMC-PACES 001788—JPMC-PACES 001790).
FSTC PACES Project Collecting Bank-Image Flow-Multiple Institutions-Unencoded (Flow No. 4) (Bates: JPMC-PACES 001792—JPMC-PACES 001794).
PACES General Business Requirements 2.3 Business Requirements; Financial Services Technology Consortium, Inc.; Mar. 17, 1999 (Bates: JPMC-PACES 001832—JPMC-PACES 001837).
PACES—System Requirements; Financial Services Technology Consortium; Jan. 1, 1999 (Bates: JPMC-PACES 001864—JPMC-PACES 001884).
FSTC PACES Functional Specifications; Financial Services Technology Consortium; Mar. 22, 1999 (Bates: JPMC-PACES 001886—JPMC-PACES 002131).
PACES Reports (Bates: JPMC-PACES 002152—JPMC-PACES 002168).
FSTC Paces Documentation Bad Tapes Draft; Mike Desman, et al.; Federal Reserve Bank; Nov. 10, 1998 (Bates: JPMC-PACES 002186—JPMC-PACES 002187).
Business Requirements Rules Analysis (Bates: JPMC-PACES 002203—JPMC-PACES 002218).
FSTC PACES Missing Check Images; Antonio C. Silva; Comerica Bank; Nov. 19, 1998 (Bates: JPMC-PACES 002223—JPMC-PACES 002225).
FSTC PACES ECP Balancing & Controls for Image Exchanges; Kenny Trice; Fleet Bank; Nov. 9, 1998 (Bates: JPMC-PACES 002226—JPMC-PACES 002228).
PACES Operations Team Status Report Issues & Concerns Boston; PACES Operations Team; Jun. 18, 1998 (Bates: JPMC-PACES 002232—JPMC-PACES 002243).
FSTC PACES Project Operations Document #1 Physical Check Truncation Identifier; John Fricke; Chase Bank of Texas; Feb. 10, 1999 (Bates: JPMC-PACES 002299—JPMC-PACES 002305).
FSTC PACES Project Operations Task #9 Image File Format; Lottie Tann; Citigroup; Feb. 10, 1999 (Bates: JPMC-PACES 002312—JPMC-PACES 002314).
FSTC PACES Project Operations Document #13 ECP Balancing & Controls for Image Exchanges (Balancing & Controls—Out of Balance Conditions); Kenny Trice; Fleet Bank; Jan. 9, 1999 (Bates: JPMC-PACES 002315—JPMC-PACES 002317).
FSTC PACES Project Back Office Application Impact Analysis Task #42; Richard Benz; Check Solutions Company; Feb. 25, 1999 (Bates: JPMC-PACES 002334—JPMC-PACES 002336).
FSTC PACES Project Operations Document #1 Physical Check Truncation Identifier; John Fricke; Chase Bank of Texas; Jan. 26, 1999 (Bates: JPMC-PACES 002349—JPMC-PACES 002353).

Check Truncation Project-Payee Thru Merchant's Deposit (Bates: JPMC-PACES 002361—JPMC-PACES 002373).
Task Assignments Listing (Bates: JPMC-PACES 002378—JPMC-PACES 002382).
PACES—Operations Working Meeting; John Fricke, et al; Apr. 20, 1998 (Bates: JPMC-PACES 002386—JPMC-PACES 002389).
FSTC PACES Paperless Automated Check Exchange & Settlement Requirements Document Draft; Financial Services Technology Consortium; Dec. 11, 1997 (Bates: JPMC-PACES 002425—JPMC-PACES 002450).
FSTC Paces Paperless Automated Check Exchange & Settlement Requirements Document Draft; Financial Services Technology Consortium; Dec. 11, 1997 (Bates: JPMC-PACES 002453—JPMC-PACES 002478).
Letter From Phyllis Meyerson to PACES Rules and Regulations Team Attaching a Draft of the PACES Rules and Regulations Requirement Document, the Truncation Issues List, and Nov. 19, 1997 Status Letter to Mariano Roldan; Meyerson, Phyllis; Nov. 18, 1997 (Bates: JPMC-PACES 002495—JPMC-PACES 002512).
Letter from Phyllis Meyerson to PACES Rules and Regulations Team Enclosing Draft of the Rules and Regulations Requirements for the Paces Project; Meyerson, Phyllis; Dec. 3, 1997 (Bates: JPMC-PACES 002514—JPMC-PACES 002524).
Letter from Phyllis Meyerson to PACES Rules and Regulations Team Regarding Status of PACES; Meyerson, Phyllis; Jan. 9, 1998 (Bates: JPMC-PACES 002526—JPMC-PACES 002530).
Outline of Decisions made by the PACES Rules and Regulatory Team Regarding Development of Rules for Image-Based ECP Exchanges; PACES Rules and Regulatory Team (Bates: JPMC-PACES 002533—JPMC-PACES 002556).
FSTC PACES Steering Committee Meeting; Financial Services Technology Consortium; Jun. 17, 1999 (Bates: JPMC-PACES 002581—JPMC-PACES 002602).
FSTC PACES Operations Open Items Toronto Meeting; Financial Services Technology Consortium; Jun. 15, 1999 (Bates: JPMC-PACES 002609—JPMC-PACES 002617).
FSTC PACES Bank Steering Committee Meeting Minutes; Financial Services Technology Consortium; Mar. 2, 1999 (Bates: JPMC-PACES 002625—JPMC-PACES 002628).
FSTC PACES Technical Architecture; Jeff Harpster, et al; Jan. 28, 1999 (Bates: JPMC-PACES 002641—JPMC-PACES 002662).
ECCHO Operating Rule and Commentary Amendments to Accommodate Truncated Items And Image Presentment (Bates: JPMC-PACES 002666—JPMC-PACES 002705).
FSTC PACES Project Operations Document #1 Physical Check Truncation Identifier; John Fricke; Chase Bank of Texas; Feb. 9, 1999 (Bates: JPMC-PACES 002707—JPMC-PACES 002713).
PACES Business Requirements; Financial Services Technology Consortium; PACES Standards Team; Apr. 3, 1998 (Bates: JPMC-PACES 002718—JPMC-PACES 002724).
FSTC PACES Paperless Automated Check Exchange & Settlement Project Proposal; Financial Services Technology Consortium; Feb. 19, 1998 (Bates: JPMC-PACES 002806—JPMC-PACES 002830).
Proposal for Change in Scope, FSTC Paces Project (Bates: JPMC-PACES 002832—JPMC-PACES 002833).
RE: More material for Aug. 31 meeting; Robert Ballen; Aug. 26, 1999 (Bates: JPMC-PACES 002875—JPMC-PACES 002876).
FSTC PACES ECP with Image to Follow Processing Exceptions; Kenny Trice; Fleet Bank; Aug. 6, 1999 (Bates: JPMC-PACES 002900—JPMC-PACES 002902).
FSTC PACES Strawhorse: Capture System Identification and IQ Suspect Flags for X9.46; R. Stefanuk; NCR Canada Ltd.; Feb. 24, 1999 (Bates: JPMC-PACES 003086—JPMC-PACES 003093).
FSTC PACES Image Presentment Exceptions; Kenny Trice; Fleet Bank; Jul. 12, 1999 (Bates: JPMC-PACES 003103—JPMC-PACES 003104).
FSTC PACES Paperless Automated Check Exchange & Settlement Requirements Document; Financial Services Technology Consortium; Apr. 3, 1998 (Bates: JPMC-PACES 003106—JPMC-PACES 003130).
FSTC PACES Missing Check Images—Revised; Antonio C. Silva; Comerica Bank; Dec. 22, 1998 (Bates: JPMC-PACES 003187—JPMC-PACES 003190).

PACES 3. Operating Rules; Feb. 5, 1999 (Bates: JPMC-PACES 003192—JPMC-PACES 003211).

FSTC PACES Paperless Automated Check Exchange & Settlement Requirements Document Standards Requirements; Financial Services Technology Consortium; Dec. 4, 1997 (Bates: JPMC-PACES 003213—JPMC-PACES 003217).

Updated Project Plan and Issues List; PACES Rules and Regulatory Team; Jul. 20, 1998 (Bates: JPMC-PACES 003280—JPMC-PACES 003288).

ECCHO Operating Rule and Commentary Amendments to Accommodate Electronic Image Draft; Jul. 21, 1999 (Bates: JPMC-PACES 003299—JPMC-PACES 003386).

Outline of Decisions made by the PACES Rules and Regulatory Team Regarding Development of Rules for Image-Based ECP Exchanges; PACES Rules and Regulatory Team (Bates: JPMC-PACES 003544—JPMC-PACES 003558).

ECCHO—Truncation Rules Table of Contents, PACES Rules—Related to ECCHO Truncation Rules, and Comments Chart; Jul. 20, 1998 (Bates: JPMC-PACES 003562—JPMC-PACES 003565).

ECCHO Operating Rule and Commentary Amendments to Accommodate Truncated Items and Image Presentment; Jul. 10, 1998 (Bates: JPMC-PACES 003566—JPMC-PACES 003606).

Business Requirements Rules Analysis with Comments from J. Sarras; Jul. 20, 1998 (Bates: JPMC-PACES 003607—JPMC-PACES 003622).

ECCHO Operating Rule and Commentary Amendments to Accommodate Electronic Image Draft (Bates: JPMC-PACES 003627—JPMC-PACES 003700).

Outline of Decisions made by the PACES Rules and Regulatory Team Regarding Development of Rules for Image-Based ECP Exchanges; PACES Rules and Regulatory Team (Bates: JPMC-PACES 003711—JPMC-PACES 003735).

PACES Functional Specifications 7.5 System Security & Recovery (Bates: JPMC-PACES 003816—JPMC-PACES 003822).

PACES Project Security Recommendations #16; Warren Lee, et al; Secure Document Systems, Inc. & Fleet Bank; Feb. 28, 1999 (Bates: JPMC-PACES 003854—JPMC-PACES 003858).

Security Sub-Group Update; Warren Lee; Secure Document Systems, Inc.; Oct. 21, 1998 (Bates: JPMC-PACES 003914—JPMC-PACES 003933).

PACES Technology Team Task List (Bates: JPMC-PACES 003992—JPMC-PACES 003993).

FSTC Paces Project Operations Task #8 Image File Format; Lottie Tann; Citigroup; Feb. 10, 1999 (Bates: JPMC-PACES 004041—JPMC-PACES 004043).

Technology Subdommittee Notes; Wayne Rothstein, et al.; Jan. 7, 1998 (Bates: JPMC-PACES 004117—JPMC-PACES 004118).

FSTC PACES Technical Architecture; Jeff Hamster, et al.; Jan. 28, 1999 (Bates: JPMC-PACES 004120—JPMC-PACES 004139).

Technology Subcommittee Notes; Mariano S. Roldan, et al.; Jan. 14, 1998 (Bates: JPMC-PACES 004141—JPMC-PACES 004142).

FSTC PACES Bank Steering Committee Meeting Minutes; Financial Services Technology Consortium; May 6, 1999 (Bates: JPMC-PACES 004280—JPMC-PACES 004283).

Business Requirements Rules Analysis (Bates: JPMC-PACES 004285—JPMC-PACES 004299).

Business Requirements Rules Analysis (Bates: JPMC-PACES 004307—JPMC-PACES 004320).

Technology issues that need to be addressed by the Technology Subcommittee (Bates: JPMC-PACES 004326—JPMC-PACES 004329).

The IBM ImagePlus High Performance Transaction System; William A. Uhrich; Remittance and Document Processing Today; vol. 14(7); May-Jun. 1992.

Draft of Financial Services Technology Consortium Interbank Check Imaging Project White Paper; Financial Services Technology Consortium; Jun. 20, 1994.

Check Image Technology in Cash Management Applications; David W. Medeiros; Tower Group; Feb. 29, 1996.

Check image capture speeds up positive pay reconcilement; Corporate Cashflow; vol. 16(2); Feb. 1, 1995.

ImagePlus High Performance Transaction System; R.F. Dinan, et al.; IBM Systems Journal; vol. 29(3).

ImagePlus High Performance Transaction System General Information Manual; IBM; GC31-2706-0.

Image Technology Applications in Check Processing; David W. Medeiros; Tower Group; Mar. 31, 1996.

Introduction to Check and Document Imaging; David W. Medeiros; Tower Group; Oct. 27, 1996.

* cited by examiner

*Sample E-Mail Notification*

Date:   Tue, 21 Dec 2000 8:47:16 -0500
From:   jeff.winn@chase.com | Block address
Subject: Positive Pay Notification
To:     agkeene@yahoo.com

---IMPORTANT DELIVERY----------------------------------------

You have received an important delivery from Jennifer Chen.
Please pick up the package at the following Web address:

*HTTPS:\\chase.com/post 1234* (handwritten)

The package will expire on Tuesday, December 21, 2000 at 4:00:00.

------------------------------------------------------------

HOW TO PICK UP YOUR PACKAGE:

\* If the Web address above is highlighted, click on it to open a browser window. You will automatically be taken to the package.

\* If the Web address above is not highlighted, follow these steps:
  - Open a Web browser window.
  - Copy and paste the entire Web address into the "location" or "address" bar of the browser.
  - Press enter.

Once you arrive at the Web page, you can access the enclosed file(s) and/or private message.

FIGURE 3

*Sample Web File*

| | | | | | |
|---|---|---|---|---|---|
| | /62 | /64 | /66 | /68 | /70 |
| | Account | Check Number | Amount | Image File | Decision |
| | 06300019999 | 123456 | $158.44 | test1.tif | Pay Return |
| | 06300019999 | 234567 | $10,513.26 | test2.tif | Pay Return |
| | 06300019999 | 345678 | $231.57 | test3.tif | Pay Return |
| | 06300019999 | 456789 | $1,199.99 | test4.tif | Pay Return |
| | 06300019999 | 567891 | $78,122.48 | test5.tif | Pay Return |
| | 06300019999 | 678912 | $10.65 | test6.tif | Pay Return |

74 — Pay All
76 — Return All
78 — Submit

79: Refer to Maker / Duplicate Item / Check Stopped / Stale Date / Suspect Item

SYSTEM AND METHOD FOR CHECK EXCEPTION ITEM NOTIFICATION

CROSS-REFERENCE TO RELATED APPLICATIONS

This application claims priority to provisional application Ser. No. 60/190,176 filed Mar. 17, 2000 entitled DISBURSEMENT EXCEPTION IMAGES, the entirety of which is hereby incorporated by reference.

BACKGROUND OF THE INVENTION

1. Field of the Invention

The present invention generally relates to a system and method for processing checks and, more particularly, to a check exception item notification system and method which provides a client with notification of exception items through e-mail.

2. Description of the Related Art

The financial services industry has long provided its customers with the ability to write checks and similar negotiable instruments. In current practice, a payor (e.g., a client of a bank or financial institution) writes a check representing an amount to be deducted from the payor's account. The check is given to a payee. Checks are normally presented for payment by the payee to the payee's banking institution (the "payee bank"). In turn, the payee bank presents the check to the payor's bank for payment. The payor's bank then pays the payee bank, and deducts the amount of the check from the payor's account, against which the check is drawn.

In order to prevent fraud and/or mistakes, most banks with large institutional clients offer these clients a service known as check exception processing. Large institutional banking clients issue a significant volume of checks on a daily basis. For example, an insurance company might issue several thousand checks in a single day in the course of processing insurance claims. The client provides the bank with a file listing information of all of the checks that it has issued (an "issue file") to payees. In performing the exception processing, the bank compares the checks issued by these clients with the checks that are presented for cashing by the payee bank.

When the payor bank receives a request for payment from the payee bank with respect to a check presented by a payee, the payor bank will then compare the information on the presented check with the issue file using, for example, the magnetic ink character recognition ("MICR") line. When a check is issued by a payor, a MICR line is usually added to the check and includes the check number and the payor account number. When the payor bank processes this check, the amount of the check is also added to the MICR line. If the payee check matches with a check in the issue file, (e.g., if the amounts, and check numbers match) the payor bank has confidence that the presented check is valid and pays the payee's bank. If the payee's check does not match any item in the issue file, the payee check is labeled an "exception item". Each business day, the payor bank provides the client of the exception service with a list of the exception items and inquire as to whether the client is interested in paying each exception item.

Prior art methods for actually notifying clients of exception items have not satisfied the needs of clients who have large numbers of checks written each day. For example, typical prior art notifications include CD-ROMs containing exception check images or reports, digital image microfilm, dial-in online access using bank proprietary software, facsimile, telephone, paper, tape and transmission index reports. Some systems allow the bank's client to connect to the bank system electronically through a network such as the Internet and view exception items.

In most of these network connections, the list of exception items is "dirty" or "unscrubbed" in that the items are typically the result of an electronic mismatch and not reviewed by bank personnel before the clients are allowed to view the exception items. This means that the exception list may include mis-encoded items, duplicate items, or items with stop payment instructions already on file. Mis-encoded items include checks where an operator keyed in the incorrect dollar amount or check serial number in the MICR line even though the dollar and check serial number fields on the face of the check are correct. In addition, in most prior art systems, the exception client is not shown an image of the exception check. Such an image must be requested separately and so the exception client typically does not have enough information to determine whether to authorize or decline payment of the check.

Therefore, none of these prior art methods and systems can satisfactorily handle the massive influx of checks and exception items produced daily by large institutions. Nor can these prior art systems handle the need of large institutions to have a list of "true" suspect items (i.e. an exception list that is "clean" or "scrubbed" to remove mis-encoded items, duplicate paid items, and items with stop payment instructions on file). Moreover, prior art systems do not provide corresponding gray-scale images of check exception items so that the client has all available information to make an accurate determination as to whether to authorize or decline payment of an exception item.

Further, in the systems where a form of media is sent to the client, there is necessarily a delay between the production of an exception item, and notification of that exception item to a client. A defined period of time must pass before a bank ceases gathering exception items to be included in the media (e.g., CDROM, paper, etc.) and subsequently sent to the client. Thereafter, the media must be physically sent to the client thereby incurring further delays. Finally, there may be a delay in the client's response as to whether the exception item should be paid. Such delays are undesirable because banks must meet a deadline established by the U.S. Federal Reserve Bank ("Fed") to submit all "return" items (those items identified by the client as suspect or fraudulent) that should be sent to the payee bank for credit. Clearly it is desirable to provide client's of the payor bank with as much time as possible to determine why a particular item is an exception item.

Therefore, there exists a need in the art for a system and method of providing clients with notification of check exception items which is faster, more efficient, and easier to use than the techniques of the prior art.

SUMMARY OF THE INVENTION

A system mainframe receives and compares issue and presentment files with one another to produce a list of exception or "suspect" items. The comparison can include, for example, a comparison of account numbers, check numbers, and check amounts. A processor then obtains images for checks which are associated with the exception items. The exception items are cross-referenced with a database of clients of the system to produce an exception file relating to clients of the system. The exception file for clients of the system and images of the checks corresponding to the exception items in the exception file are fed to a server. The server produces a Web file (including the exception item description and the corresponding images) and corresponding uniform resources locator ("URL") to address the web file. Each URL is unique to both the individual e-mail address and file so that two individuals do not access the same web page even if the exception information sent to these two individuals is identical (for example, two individuals within the same company which receive exception notification for the same account). Moreover, the URL is changed each time a new web file is generated.

The server also produces an e-mail notifying the exception client of the exception item. The e-mail includes a hyperlink to the created URL. In operation, the exception client receives the e-mail, links to the Web file through the use of the hyperlink, and quickly accesses the Web file. Once connected with the Web file, the exception client authenticates with the server and authorizes or declines payment of the exception item. Due to deadlines imposed by the FED, if a client does not submit a processing instruction (e.g. "pay" or "return") within a negotiated deadline, a default instruction will be used. The web files are set to expire at a preset time every business day so as to prevent access after the negotiated deadline.

Thus, a faster, more efficient, and easier to use system and technique is available than systems and techniques of the prior art.

These aspects, as well as others, will become apparent upon reading the following disclosure and corresponding drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

DETAILED DESCRIPTION OF THE PREFERRED EMBODIMENT(S)

Figure 1:
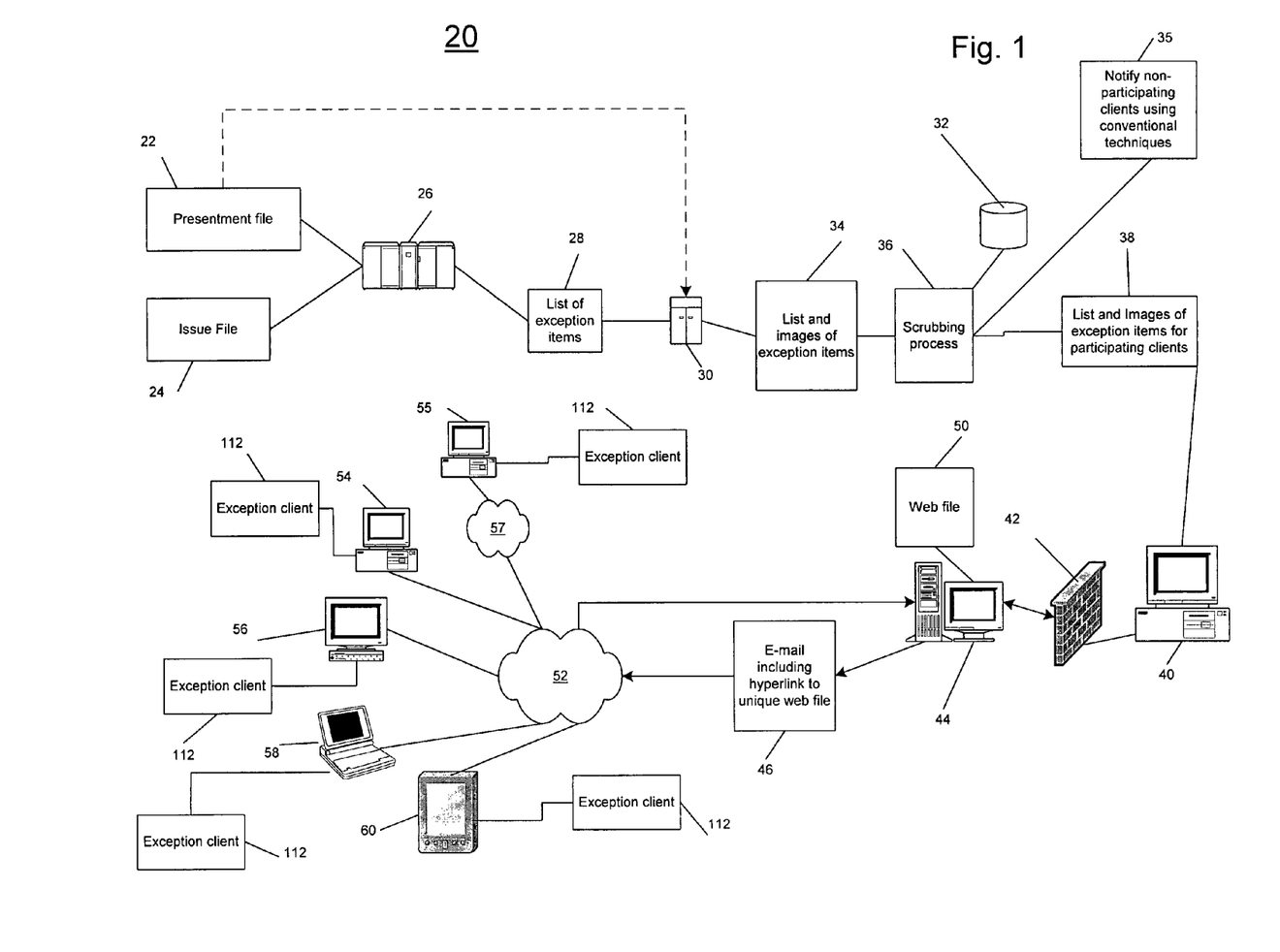
FIG. 1 is a diagram of a check exception item notification system in accordance with the invention.

Referring to FIG. 1, there is shown a check exception item notification system 20 in accordance with the invention. An issue file 24 relating to payor checks and a presentment file 22 relating to presented checks submitted by payees requested for cashing against accounts of clients of a financial institution using system 20, are both sent to a system mainframe 26.

System mainframe 26 compares presentment file 22 and issue file 24 with each other to produce a list of exception items 28. The comparison could include, for example, a comparison of account numbers, check amounts, and check numbers in issue file 24 with items presented for payment in the presentment file 22. Mainframe 26 could also review issue dates of checks in the presentment file to determine if checks presents are "stale" (e.g. more than a specified number of days past the issue date, such as 180 days past the issue date). Additionally, mainframe 26 could review the amount of a check presented to see if it is beyond a particular dollar value and so would merit review by a client based on parameters set during service implementation.

When a comparison of issue file 24 and an item presented in the presentment file 22 do not match, an exception item is created. Such an exception item could be a pointer pointing to the representation of the check in the presentment file 22 that did not match the corresponding representation of the check in the issue file 24. Alternatively, the exception item could be a copy of the item in the presentment file. System mainframe 26 produces an exception file 28 of these exception items.

Exception file 28 is sent to an image archive processor 30 which performs an image matching process using data from presentment file 22 to produce images corresponding to each exception item thereby producing an image exception file 34. Each image can then be shown to a client 112 of a bank using system 20 to assist the client 112 in determining whether to authorize or decline payment of the exception item. Image archive processor 30 can be, for example, an image distribution and support system such as the MIDAS (Multi-processing Image Distribution and Support System) owned by J. P. MORGAN CHASE & COMPANY. The images can be in, for example, a JPEG (Joint Pictures Experts Group) format, an ABIC (Adaptive Bi-Level Image Compression) format, or a TIFF (Tagged Image File Format) file.

A scrubbing system 36 may be used to review image exception file 34 for accuracy and select only "true" exception items to remain in image exception file 34. For example, an operator of scrubbing system 36 can determine if an error occurred in a field in the MICR line of the presented check due to a mistake in manual entry, if there is a stop payment on file, or if the check was already presented for payment. The operator can then prevent the exception item from being sent to a client thereby ensuring that the client need only review "true" exception items that the financial institution using system 20 needs verification of validity. Scrubbing system 36 also refers to a database 32 to determine clients participating in system 20. Those clients who do not participate in system 20 will receive a notice of the exception items through conventional methods (e.g. facsimile, mail, etc.) as is shown at 35. The scrubbing process 36 then outputs a client image and exception file 38 which includes exception items and corresponding images for clients who participate in system 20.

Client image and exception file 38 is fed through an electronic commerce gateway 40 and a firewall 42 to an integrated messaging exchange (hereinafter "IME") server 44. Electronic commerce gateway 40 prepares exception image file 38 for delivery through IME server 44 by converting the file to XML (Extensive Markup Language) format. IME server 44 can be, for example, a TUMBLEWEED COMMUNICATIONS IME server made by TUMBLEWEED COMMUNICATIONS, INC. IME server 44 generates a Web file 50 (described more completely below with reference to FIG. 3) and a corresponding Uniform Resources Locator (hereinafter "URL") to address Web file 50. This URL is designed so as to be unique for each client of check exception item notification system 20 so that only a particular client can access the Web file 50 including check exception items relating to that particular client. The URL is unique to both the individual e-mail address and the file so that two individuals do not access the same web page even if the exception information sent to these two individuals is identical (for example, two individuals within the same company which receive exception notification for the same account, receive a distinct URL). Moreover, the URL is changed each time a file a generated.

As is known in the art, the URL can be entered into any standard Web Browser and used to navigate through the Internet and make a connection with Web file 50 through IME server 44. Examples of typical Web Browsers include NETSCAPE NAVIGATOR, NETSCAPE COMMUNICATOR and MICROSOFT INTERNET EXPLORER. The Web file 50 is stored on IME server 44. IME server 44 thus may be any computer device capable of providing Web page HTML and/or JAVA data to a requesting device.

Figure 2:
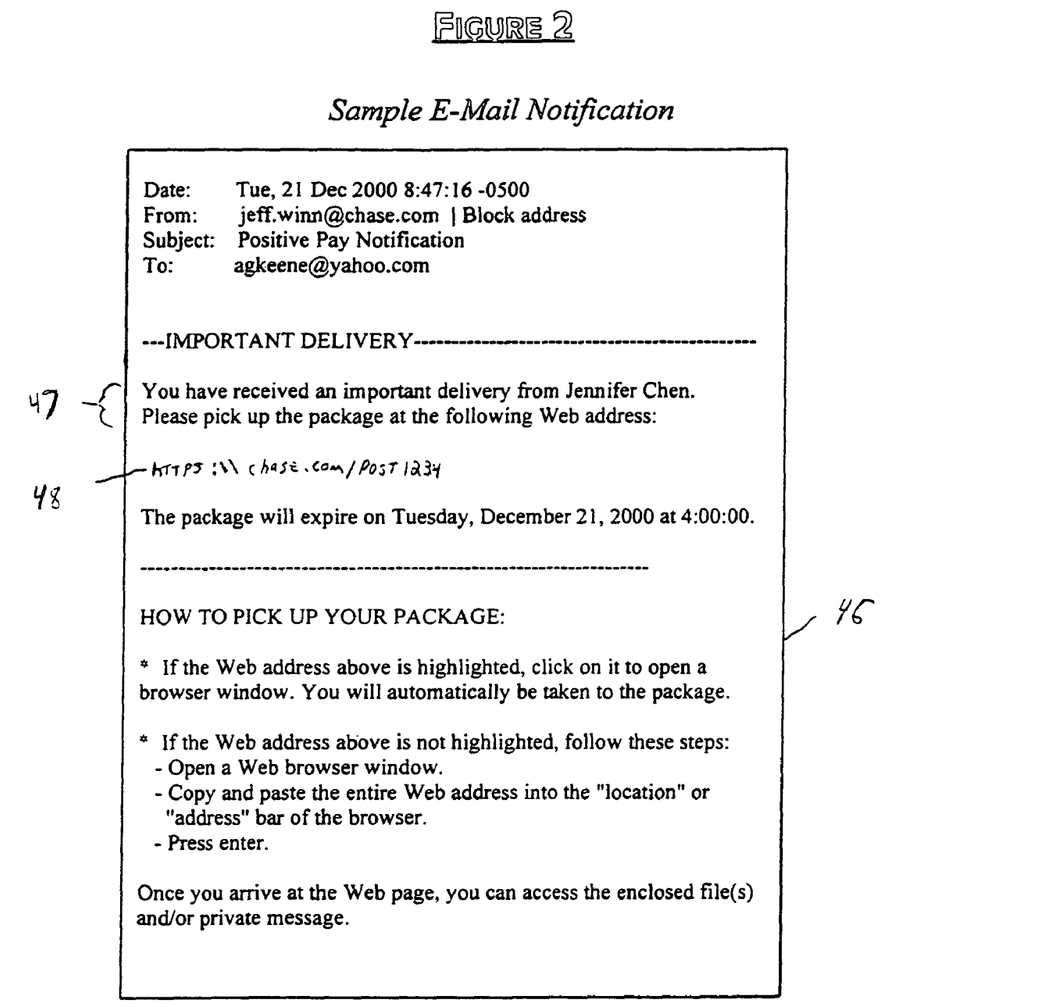
FIG. 2 shows an example of an e-mail generated in accordance with the invention.

IME server 44 further generates an e-mail file 46 that is sent to each exception client using a two-way communication channel that is secured using software such as that produced by TUMBLEWEED CORPORATION. E-mail file 46 can contain a hyperlink to the unique URL created for the particular exception client. Referring to FIG. 2, there is shown an example of an e-mail file 46 that is sent to an exception client. As is shown in the figure, e-mail file 46 includes a message 47 notifying the client of the exception item and a hyperlink 48 including the URL defined for Web file 50 to allow the exception client to quickly access Web file 50. In the event that a client does not have any exception items for the day, the client will receive an e-mail stating "you have no exception items today" in the subject line. Such an e-mail will not include hyperlink 48.

Referring again to FIG. 1, IME server 44 sends e-mail file 46 through a network 52 to an exception client 112. Network 52 can be, for example, the Internet, a value added network ("VAN"), or a corporate Intranet. Exception clients 112 of system 20 can access e-mail 46 using any known e-mail accessing device. For example, clients 112 can access e-mail 46 through a computer terminal 54, a computer terminal 55 coupled to another network 57 that is in turn coupled to network 52, a stand alone Web access terminal 56, a palmtop computer 58, a personal digital assistant 60, a personal Internet appliance ("PIA", not shown), a cellular telephone (not shown), a mailstation (not shown), a mass marketed Internet device like WEBTV (not shown), or any other type of Internet appliance. Other devices which can receive e-mail only could also be used (e.g. a telephone with text messaging capabilities or a pager) to access e-mail file 46.

Once the exception client 112 receives e-mail 46 and is notified of the exception item (or items), the exception client has the option of quickly accessing information regarding the exception item. Exception client 112 can access Web file 50 including such information stored on IME server 44 through any known method for accessing a file over a network. For example, exception client 112 can use the same one of the e-mail access devices mentioned above. Any one of these devices could be used to connect over network 52 to thereby access Web file 50 stored on IME server 44. When attempting to access Web file 50, exception client 112 is first prompted to enter a unique password assigned to the exception client by a financial institution using check exception item notification system 20. Upon successful authentication, exception client 112 is presented with the contents of Web file 50. If the client fails to correctly authenticate itself with system 20, an error message is displayed and the client will not be able to view exception information.

For example, the exception client 112 can use computer terminal 54 to receive e-mail 46 referencing the exception item and including hyperlink 48. The exception client 112 can quickly actuate link 48 to navigate through network 52 to IME server 44 and access Web file 50. The exception client can view the exception items (as detailed below) and provide authorization to pay or decline payment for each exception item.

Figure 3:
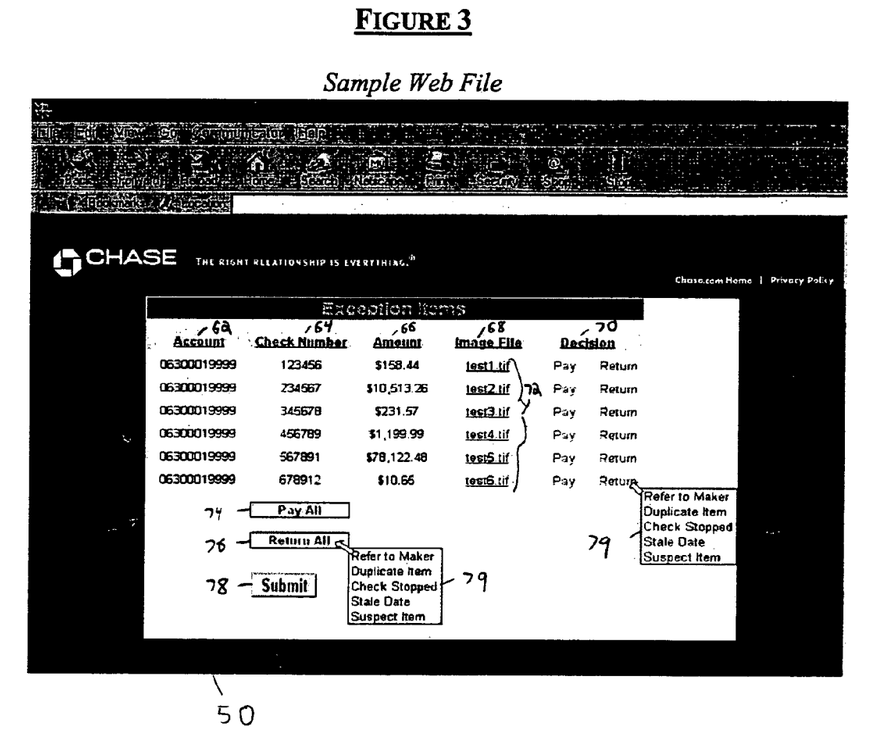
FIG. 3 shows the contents of a typical Web file used in accordance with the invention.

FIG. 3 shows a typical Web file 50 created in accordance with the invention. As stated above, Web file 50 includes a list of client exception items for a particular exception client. This list can include any type of check exception item indicia. These indicia can be, for example, those shown in FIG. 3. An account section 62 indicates the account number of the exception client. A check number section 64 indicates the check number of the exception item. An amount section 66 indicates the amount of the exception item listed on the payor's check. An image file section 68 provides links to image files containing images of the exception items. A decision section 70 lists authorization or decision options for the exception item relating to the exception item. Image file links 72 allow the exception client to view an image of the exception item. A pay all button 74 allows the exception client to authorize payment of all of the displayed exception items simultaneously. A return all button 76, allows the exception client to decline payment of all of the displayed exception items simultaneously. A submit button 78 allows the exception client to submit the choices made in the decision section 70 to IME server 44.

In use, exception client 112 reviews the contents of the exception items listed in Web file 50. Once the exception client opens Web file 50, a SMTP (Simple Mail Transfer Protocol) notice is sent from IME server 44 to electronic commerce gateway 40 informing electronic commerce gateway 40 that the exception client has accessed Web file 50. For each exception item, the exception client 112 has a choice under decision section 70 to authorize payment of the check ("pay") or decline payment of the check ("return"). The exception client 112 selects either "pay" or "return" for each one of the exception items listed. Once a decision has been made for all exception items, the exception client then clicks submit button 78 to send all decisions on the displayed page to electronic gateway 40. Each page is generally submitted individually. Clicking on submit button 78 will generate a prompt (not shown) inquiring as to whether the exception client is sure of her decision. When the exception client indicates that he is sure of his decision, processing continues. Actuation of submit button 78 will create a file of only those items to which the exception client has responded. If the exception client does not provide a decision to all of the exception items (i.e. a "partial submission") all other exception items that have not been replied to will remain in Web file 50 and will appear again if the URL is later accessed. Conversely, those exception items for which the exception client does provide a decision, are removed from Web file 50.

If the exception client desires, the exception client can choose to pay all of the exception items displayed on the current page of Web file 50, by clicking on the pay all button 74. Alternatively, the exception client can decline payment of all of Hthe displayed exception items by clicking on the return all button 76.

If any return decision is selected by the exception client with respect to an exception item (i.e. return for an individual exception item or use of the return all button 76), a drop down list 79 containing predefined reasons for the rejection is displayed from which the exception client 112 may choose. Return list 79 could include, for example, "refer to maker", "duplicate item", "check stopped", "stale date", and "suspect item" choices. A suspect item is a check that does not correspond to standard parameters to which checks of the exception client usually conform. If no reason is selected, an error page notice is generated by IME server 44 informing the client that a return reason should be selected prior to submission of the decision.

Figure 4:
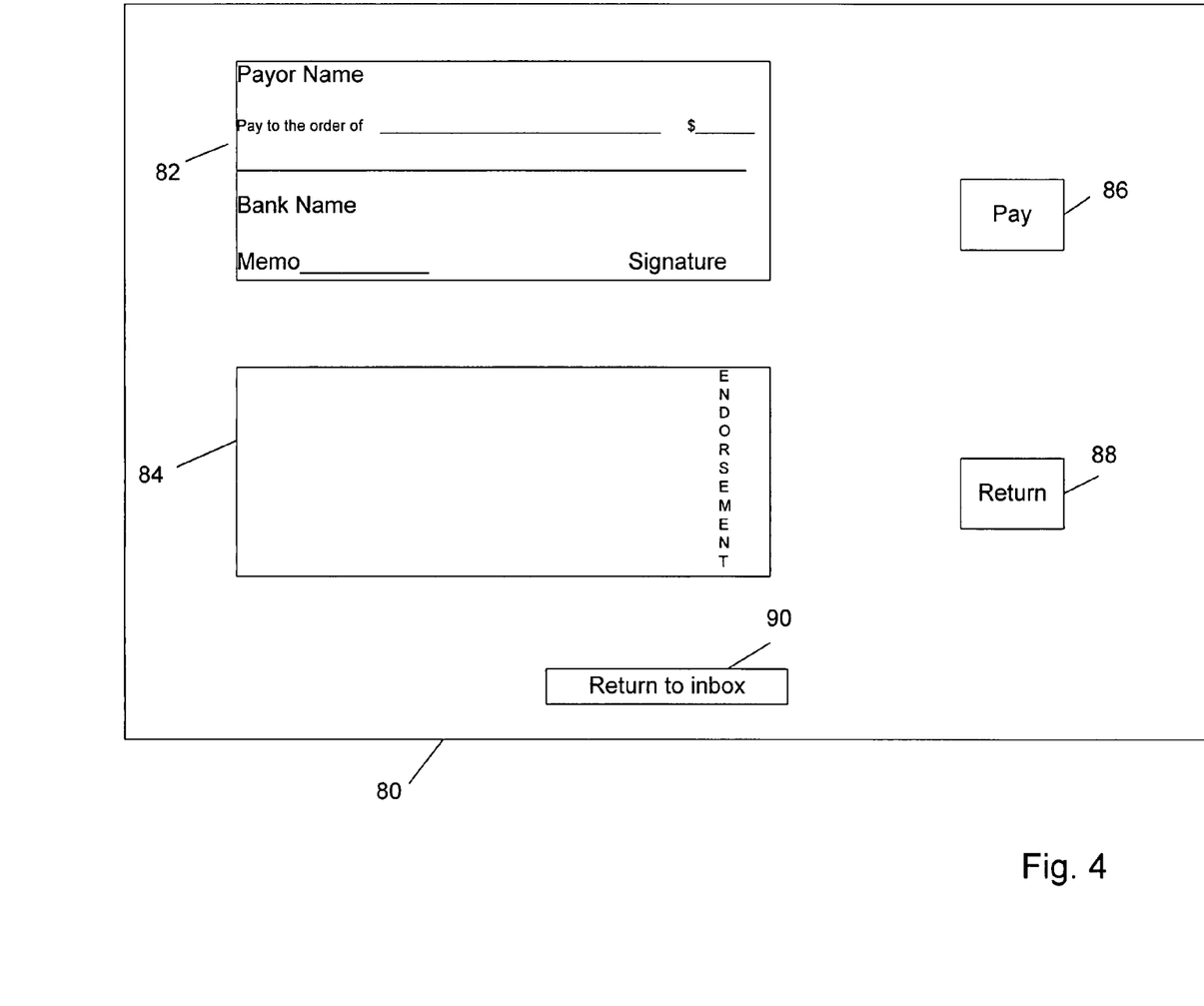
FIG. 4 is a diagram of an image file created in accordance with the invention.

If exception client 112 would like to view the check corresponding to a particular exception item, the exception client can click on one of the images file links 72. Clicking on one of these links will bring the exception client to an image file 80, stored on server 44, corresponding to a particular exception item. Referring to FIG. 4, image file 80 includes an image 82 of the check front and an image 84 of the check back of the submitted payor check corresponding to the particular exception item. The exception client 112 can review the check images 82, 84 and decide whether to authorize payment of the exception item. A click on a pay button 86 allows the exception client to authorize payment of the check whose image is displayed and a click on a return button 88 allows the exception client to refuse payment of the check whose image is displayed. Once the exception client 112 has made the decision, web file 50 is updated with the selected decision for the image file 80.

All decisions made and submitted by the exception client (hereinafter generally referred to as "decision files") are received and processed by IME server 44 and then sent to electronic gateway 40. IME server 44 can periodically (e.g., every hour from 8:00AM to 1:30PM and then every five minutes between 1:30PM and 2:00PM) send created decision files to electronic gateway 40.

Each decision file has the exception client's account number and the date. If the exception client submitted a partial submission, IME server 44 holds the decision file until the submission is completed or until a designated time (e.g. 2:00 PM) during the business day. After that designated time, all decision files, regardless of whether they are partial submissions or not, are sent to electronic gateway 40. At a desired time during the day (e.g. 3:30PM), the unique URL assigned to the exception client for Web file 50 can be set to be invalidated or expire so that the link is no longer available. Alternatively, the URL can be set to remain valid for a plurality of days. IME server 44 can be programmed to send an e-mail to electronic gateway 40 indicating clients who have not accessed Web file 50 by a certain time during the day (e.g. 1:30 PM). System mainframe 26 will periodically pick up decision files from electronic gateway 40, process the return files and pay or decline the payee bank accordingly.

The exception client 112 is instructed by an institution employing check exception item notification system 20 to approve or disapprove each exception item on a current business day no later than an established decision deadline. If the exception client fails to provide electronic commerce gateway 40 with a decision prior to that deadline, a default decision of either "pay" or "return", depending on the client's service agreement, will be entered.

Although a plurality of processors (e.g., mainframe 26, processor 30, gateway 40, etc.) are shown, clearly it is within the scope of the invention to have most or all processing performed in a single processor.

Thus, by providing an exception client with a prompt notification of exception items via e-mail, and allowing the exception client to view information and images relating to the exception items in a Web file through a uniquely defined URL, a faster and more efficient exception check item notification system is possible than that available in the prior art.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A computer-implemented method of notifying an exception clients associated with a payor financial institution of at least one exception item, said method comprising:

receiving a presentment check file at a computing system, said presentment check file including presentment information related to multiple presented checks, the multiple presented checks requested for cashing against accounts of at least. one of the exception clients of the payor financial institution and presented to the payor financial institution for payment:

receiving a payor check file at the computing system from the at least one exception client associated with the payor financial institution, said payor check file including check information relating to checks written by said exception client;

comparing said presentment check file with said payor check the implementing a first processor, the comparison identifying whether the presentment information related to each of the multiple presented checks corresponds to the check information in the payor check file such that identified presentment information without matching check information creates the at least one exception item, thereby producing an exception file including the at least one exception item;

generating a Web file from the exception file implementing a second processor, said Web file including an image relating to said at least one exception item;

generating an address for said Web file;

sending said exception client an e-mail notifying said exception client of said at least one exception item; and including a hyperlink to said address in the e-mail, the hyperlink allowing the exception client to access the web file.

2. The method as recited in claim 1, further comprising:
generating an image of said exception item; and
wherein said Web file includes said image.

3. The method as recited in claim 1, further comprising performing a scrubbing process to determine whether said exception item is a true exception item.

4. The method as recited in claim 1, further comprising causing said address to expire at a predetermined time.

5. The method as recited in claim 1, further comprising sending a simple mail transfer protocol notice to said payor financial institution when said exception client accesses said Web file.

6. The method as recited in claim 1, wherein said sending includes sending said e-mail across a network.

7. The method as recited in claim 1, wherein said method is used in an exception item notification system and said method further comprises:

comparing said at least one exception item with a database of clients of said exception item notification system; and
sending said e-mail only when said exception client is a client of said exception item notification system.

8. A computer-implemented method of notifying an exception clients associated with a payor financial institution of at least one exception item, said method comprising:

receiving a presentment check file at a computing system, said presentment check file including presentment information related to multiple presented checks, the multiple presented checks requested for cashing against accounts of at least one of the exception clients of the payor financial institution and presented to the payor financial institution for payment;

receiving a payor check file at the computing system from the at least one exception client associated with the payor financial institution, said payor check file including check information relating to checks written by said exception client:

comparing said presentment check file with said payor check file implementing a computer processor, the comparison identifying whether the presentment information related to each of the multiple presented checks corresponds to the check information in the payor check file, such that identifying presentment information without matching check information locates the at least one exception item;

creating an exception file including each located exception item;
performing an image matching process implementing an image archive processor to produce an image corresponding to each exception item in the exception file, thereby creating an image exception file;
scrubbing the image exception file to identify valid exception items for exception client review;
generating a web file from the scrubbed image exception file and storing the web file on a server, the web file including the valid exception items from the image exception file in a web accessible format;
generating an address for said web file;
sending said exception client an e-mail notifying said exception client of said at least one exception item; and
including a hyperlink to said address for the web file in the e-mail, the hyperlink allowing the exception client to access the web file.

9. The method of claim 1, further comprising providing through the web file at least one decisioning link allowing the exception client to make a decision to deny or approve payment of each exception item.

10. The method of claim 9, further comprising automatically processing payment for a selected exception item upon receiving an approval through the decisioning link and eliminating the processed exception item from the exception file.

11. The method of claim 9, further comprising providing a drop down menu visible upon denial of payment, the drop down menu providing selectable reasons for denial.

12. The method of claim 9, further comprising creating a decision file based on received approvals and denials.

13. The method of claim 9, further comprising automatically entering a default decision if the exception client fails to make a decision.

* * * * *